(12) United States Patent
Wilke et al.

(10) Patent No.: US 12,650,039 B2
(45) Date of Patent: Jun. 9, 2026

(54) ACTUATING PORTION FOR A VEHICLE DOOR HANDLE ASSEMBLY AND METHOD FOR PRODUCING SUCH AN ACTUATING PORTION

(71) Applicant: ILLINOIS TOOL WORKS INC., Glenview, IL (US)

(72) Inventors: Zsolt Wilke, Bad Mergentheim (DE); Elmar Fries, Rottingen (DE); Steffen Kolb, Würzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 701 days.

(21) Appl. No.: 18/100,414

(22) Filed: Jan. 23, 2023

(65) Prior Publication Data

US 2023/0235602 A1    Jul. 27, 2023

(30) Foreign Application Priority Data

Jan. 25, 2022    (DE) ..................... 10 2022 101 655.2

(51) Int. Cl.
| | |
|---|---|
| *E05B 85/00* | (2014.01) |
| *B29C 45/14* | (2006.01) |
| *E05B 85/16* | (2014.01) |
| *B29L 31/30* | (2006.01) |

(52) U.S. Cl.
CPC ........ *E05B 85/16* (2013.01); *B29C 45/14786* (2013.01); *B29C 45/14795* (2013.01); *B29L 2031/3029* (2013.01)

(58) Field of Classification Search
CPC ............... E05B 85/16; B29C 45/14786; B29C 45/14795; B29L 2031/3029

USPC ......................................................... 296/1.02
See application file for complete search history.

(56) References Cited

U.S. PATENT DOCUMENTS

| | | | |
|---|---|---|---|
| 12,146,352 B2 | 11/2024 | Wilke et al. | |
| 2003/0095416 A1* | 5/2003 | Huizenga ............. | B60Q 1/2669 |
| | | | 362/100 |
| 2010/0171324 A1 | 7/2010 | Stapf | |
| 2019/0194983 A1* | 6/2019 | Kalesse ................. | H01Q 1/3283 |
| 2019/0389097 A1* | 12/2019 | Heikkila ................. | B29C 43/56 |
| 2019/0389104 A1* | 12/2019 | Heikkila ........... | B29C 45/14196 |
| 2020/0190870 A1* | 6/2020 | Kalesse ............... | B60R 16/0222 |
| 2025/0034919 A1 | 1/2025 | Wilke et al. | |

FOREIGN PATENT DOCUMENTS

| | | | |
|---|---|---|---|
| DE | 3932416 A1 | 4/1991 | |
| DE | 10001009 A1 | 7/2001 | |
| DE | 10001010 A1 | 7/2001 | |
| DE | 10211662 A1 | 10/2003 | |
| DE | 102005022791 A1 | 11/2006 | |
| DE | 102019111328 A1 | 10/2020 | |
| EP | 1810811 A1 | 7/2007 | |
| EP | 2851174 A1 | 3/2015 | |

* cited by examiner

*Primary Examiner* — Steven O Douglas
(74) *Attorney, Agent, or Firm* — THOMPSON HINE LLP

(57) ABSTRACT

An actuating portion for a vehicle door handle assembly, in particular an inner door handle assembly, wherein the actuating portion includes a carrier portion formed by co-injection, having a core and an outer layer, and a decorative portion connected to the carrier portion, in particular integrally, wherein the actuating portion has been produced in a multi-component injection-molding method, in particular in a three-component injection-molding process.

13 Claims, 2 Drawing Sheets

11  12  2

3

1

7  1  4, 10  8

5, 6

ACTUATING PORTION FOR A VEHICLE DOOR HANDLE ASSEMBLY AND METHOD FOR PRODUCING SUCH AN ACTUATING PORTION

TECHNICAL FIELD

The present invention relates to actuating portions for a vehicle door handle assembly, in particular an inner door handle assembly. The present invention further relates to a vehicle door handle assembly, in particular an inner door handle assembly with a corresponding actuating portion as well as a method for manufacturing such an actuating portion.

BACKGROUND

The actuating portion of the type considered herein can be, for example, a handle portion. This can be, for example, a handle lever that is pivotally supported on a housing of the door handle assembly. The actuating portion can be formed to be gripped by a vehicle occupant in order to open and/or to close a vehicle door from the interior.

The housing and the actuating portion of such a door handle assembly, in particular the inner door handle assembly, are often made of plastic. For optical reasons, there is generally a desire for a metallic visual appearance of the actuating portion. In the prior art, the handle lever is generally chrome-plated for this purpose. In this way, high-quality surfaces can be manufactured, while the base body of the actuating portion equipped with the chromium portion can at the same time be manufactured from a durable plastic. However, chromium plating, in particular using chromium VI, is problematic for health and environmental reasons.

An alternative to chromium plating is to manufacture the actuating portion in an injection molding process with a plastic having a metallic visual appearance (mold-in metal color—MIMC). A visual appearance similar to chromium plating can thus be achieved. However, surface defects such as flow lines and voids, in particular due to the shrinkage of the material, are problematic. In addition, the plastics used for this purpose are not always sufficiently durable and in particular do not always have the required maximum breaking load. By way of extrapolation, the same is true for the housing of the vehicle door handle assembly.

SUMMARY

Based on the foregoing, the underlying problem addressed by the invention is to specify an actuating portion, in particular a handle element, of a vehicle door handle assembly, as well as a method for manufacturing such an actuating portion, wherein this enables cost-effective, high-quality surfaces of the actuating portion with considerable design freedom while also achieving good durability.

Accordingly, the invention relates in particular to an actuating portion for a vehicle door handle assembly, in particular an inner door handle assembly, wherein the actuating portion comprises a carrier portion formed by co-injection, having a core and an outer layer, and a decorative portion integrally connected to the carrier portion wherein the actuating portion has been produced in a multi-component injection-molding method, in particular in a three-component injection-molding process.

According to the invention, it is provided in particular that the decorative portion comprises a visible region, which forms the so-called "A-side" of the actuating portion. The A-side of the actuating portion forms the visible side of the actuating portion in the intended installation state of the actuating portion and furthermore in particular in the non-actuated state of the actuating portion.

The decorative portion is preferably formed from a plastic material that can in particular be different from the plastic material from which the carrier portion of the actuating portion is formed.

In particular, the decorative portion is integrally connected to the carrier portion, preferably in a substance-to-substance bond (e.g., resulting in a unitary/monolithic structure). At least in the installed state, the visible side of the decorative portion corresponds to the aforementioned A-side of the actuating portion and is thus at least partially directly visible from the vehicle interior when the actuating portion is used for an inner door handle assembly of a vehicle. At least regionally, the decorative portion, which is preferably formed integrally with the carrier portion of the actuating portion, also extends to the so-called "B-side" of the actuating portion, i.e., to the side facing away from the A-side of the actuating portion.

According to the invention, the actuating portion is formed by a co-injection process and comprises a core and an outer layer.

In other words, the plastic components (melts) forming the carrier portion are injected into the same shape (co-injection) in succession from the same injection point in time. In this case, for flow and cooling reasons, the first injected plastic component comes to rest on the wall of the injection mold and thus to lie on the surface of the injection-molded part (carrier portion). Accordingly, in this method, an injection-molded part is produced with a core and an outer layer.

By contrast to a bi-injection, in which the plastic components are simultaneously injected into the same mold cavity from different injection points, the co-injection does not result in a binding seam, which regularly causes some weakening of the injection-molded part. By forming the carrier portion with the aid of the co-injection, a particularly resilient injection-molded part is thus formed.

The terms "co-injected", "co-injection" or "co-injection method" are not only intended to mean the known co-injection in the narrower sense of the term within the scope of this disclosure. Rather, co-injection is also intended to be understood herein as any similar or equivalent processes in which two or more plastic components are injected sequentially through a nozzle or injection point. In this context, the mono-sandwich method, as described for example in DE 39 32 416A1, should also be mentioned.

With the invention, the above-described co-injection method for producing the carrier portion of the actuating portion is employed in a new manner. Of only one of the plastic components used, a sufficient amount is injected so as to be able to reach and fill in the region of the outer layer of the carrier portion in the injection-molded mold at all. By contrast, the at least one further plastic component is quantitatively sized so as to remain in the region of the core of the carrier portion. This results in a corresponding core-shell structure.

The decorative portion is injected onto this core-shell structure of the carrier portion formed by co-injection.

According to design variants, the decorative portion is connected to the carrier portion at least in parts or regionally by means of a positive-lock connection, in particular by an engagement of at least one first connecting partner provided on the decorative portion and at least one second connecting partner provided on the carrier portion.

The decorative portion can be connected to the carrier portion via a pure positive-lock connection.

According to implementations of the actuating portion, the carrier portion is manufactured in a first co-injection step using a first mold half and a second mold half, resulting in a first precast having a core-shell structure. The decorative portion is produced in a separate, second injection molding shot onto the first precast after a change of the first mold half and/or the second mold half. A second precast is thereby formed. The first precast, i.e., the carrier portion with the core-shell structure, remains in the mold cavity at least until the plastic component of the decorative portion has been shot at the first precast into the second injection molding shot.

However, it is conceivable as an alternative that the decorative portion is first produced in a first injection-molding step using a first mold half and a second mold half, resulting in a first precast, wherein the carrier portion is produced in a subsequent (second) co-injection step fired at the first precast after a change of the first mold half and/or the second mold half, resulting in a second precast, while the first precast remains in the first or second mold half of the mold cavity until the second precast is fired at it.

In the co-injection step for forming the carrier portion of the actuating portion, as already stated, the plastic component of the outer layer of the carrier portion and then the plastic component of the core of the carrier portion are injected into the mold cavity sequentially one after the other from the same injection point.

In this context, it is conceivable that, upon or after injection of the plastic component of the core of the carrier portion, a gaseous injection medium is preferably still injected.

In other words, when injecting the plastic component of the core of the carrier portion, a gas injection technique can in particular be employed so as to make the core of the carrier portion hollow or foamy, at least regionally. In this gas injection technique, cooled gas (cool gas GIT) can be employed. Alternatively, a gas injection technique with subsequent gas purging or a gas injection technique with subsequent purging with cooled gas is also conceivable.

In order to ensure the reliability of the actuating step, it is provided according to the preferred embodiment that the core of the carrier portion formed by co-injection consists of a first plastic component, in particular a glass fiber-reinforced plastic component, wherein the outer layer of the carrier portion formed by co-injection consists of a second plastic component different from the first plastic component.

The decorative portion preferably consists of a third plastic component that is different from the first and second plastic components.

A front side of the actuating portion is preferably defined by surfaces of the actuating portion facing the vehicle cabin when the actuating portion is installed in the vehicle with an inner door handle assembly and is in a resting position. The boundary between the front side and the rear side of the actuating portion is preferably defined by the surfaces facing parallel to the surface of the vehicle surface that directly surrounds the actuating portion in a state when installed in the vehicle and in a resting position.

Preferably, a surface direction points in the direction of its normals (facing outward, away from the material).

Directly visible preferably means that there is no further coating (e.g., paint or chrome) or over-molding of the decorative portion. The plastic of the decorative portion is preferably the outermost surface layer of the actuating portion in the region of the directly visible regions of the decorative portion.

The decorative portion is integrally connected to the carrier portion, which preferably means as a substance-to-substance bond, i.e., such that they are held together by atomic or molecular forces and are inseparable and can only be separated by destruction. However, the meaning also includes a positive-locking connection of the decorative portion, wherein the positive locking is produced by the injection molding process within an injection molding tool. A bond by atomic or molecular forces is therefore not absolutely necessary, but rather preferred.

Because, according to the invention, a material different than for the carrier portion is used for the decorative portion, preferably the visible region, the carrier portion and the decorative portion, and preferably the visible region, can be specifically adapted to the respective requirements. The substance-to-substance bond at the same time forms an integral component such that no additional fastening means are required. This not only improves the visual appearance, but also simplifies the manufacturing and assembly of the actuating portion.

According to one aspect, the solution according to the invention is in particular characterized in that the decorative portion of the actuating portion comprises at least one gate region by which the heated injection molding compound is introduced into a mold cavity of an injection molding tool through at least one gate channel, wherein the mold cavity corresponds at least regionally to the shape of the actuating portion and in particular to the shape of the decorative portion of the actuating portion.

The at least one gate region is then in particular formed in a gate lip or gate tab, wherein the gate region is continuously connected to the visible region of the decorative portion by at least one edge region or arcuate region.

This has the advantage that no injection marking is visible on the visible side of the actuating portion, i.e., on the A-side of the actuating portion, due to a rear injection into the inner region of the mold body. Thus, no additional removal of the injection marking is necessary, even in the case of a subsequent external surface treatment.

Because the at least one gate region is formed in a gate lip or gate tab, wherein said gate lip or gate tab is continuously connected to the visible region of the decorative portion by at least one edge region or arcuate region, a homogenization of the heated injection molding compound can also be achieved when the heated injection molding compound is fed into the mold cavity such that the melt (the heated injection molding compound) can flow in the mold cavity from the gate region (i.e., from the gate lip or gate tab) over the at least one edge region or arcuate region to the visible region of the decorative portion at a reduced volumetric flow rate and without local densification. This achieves that the heated injection molding compound reaches the visible region of the decorative portion by at least one "gentle" transition.

By first becalming and homogenizing the heated injection molding compound in a region different from the visible region of the actuating portion when introducing it into the mold cavity, and because the thus homogenized heated injection molding compound subsequently continuously reaches the region of the mold cavity that corresponds to the visible region of the decorative portion, it is possible to form the decorative portion by using a plastic material with integrated pigments without the risk of creating undesirable flow lines in the visible region of the decorative portion.

This measure must be taken into account in particular when a plastic material with embedded pigments is used to form the decorative portion, since the pigments do not form a continuum in the melt (i.e., in the heated injection molding compound). Accordingly, it is therefore necessary to ensure that the melt with the embedded pigments is not densified in the visible region of the actuating portion, since a local densification of the melt would lead to a densification of the pigments, which would generate corresponding defects (in particular lines) in the finished actuating portion.

By providing a gate region formed in a gate lip or gate tab that is continuously connected to the decorative portion's visible region by at least one edge region or arcuate region, a volumetric flow becalming of the melt can then be achieved when introducing the heated injection molding compound into the mold cavity, that is to say before or while the melt flows from the gate region to the visible region of the decorative portion. In this way, a higher surface quality is achieved, wherein an optionally provided surface finish can also be improved in a subsequent treatment, e.g., by painting.

With regard to the gate lip or the gate tab, in which the at least one gate region is formed, it is noted that the gate lip or gate tab represents a relatively small volume range by which the heated injection molding compound is fed into the mold cavity through corresponding gate channels.

Because said relatively small volume range that forms the gate lip or the gate tab is then by at least one edge region or arcuate region continuously connected by a volumetric flow to the region of the mold cavity that ultimately represents the visible region of the actuating portion, the melt is gently redirected and evenly relaxed as the melt flows from the gate region to the visible region of the actuating portion, which effectively prevents local densification of the melt in the visible region of the decorative portion.

As already indicated, there are partially not insignificant requirements with regard to the durability, in particular related to maximum breaking load. According to the present invention, these can be easily fulfilled by selecting a correspondingly durable material for the carrier portion. At the same time, by selecting a suitable other material for the decorative portion, preferably for the visible region, a visually particularly high-quality surface can be realized without the material used for this purpose, which is often not sufficiently durable, affecting the overall durability of the actuating portion.

For example, a material with a metallic look is possible for the decorative portion, preferably the visible portion. Chromium plating, which as explained is problematic for environmental and health reasons, can be omitted.

The decorative portion, preferably the visible portion, can have of a substantially smaller thickness than the carrier portion. For example, the greatest thickness of the decorative portion, preferably the visible region, can be less than 50% of the smallest thickness of the carrier portion, preferably less than 20% of the smallest thickness of the carrier portion. As a result, the stiffness of the actuating portion provided by the carrier portion can be maximized while maintaining a low slope to surface defects of the decorative portion, preferably the visible portion. In particular, when for example only one surface facing the vehicle inner is formed by the decorative portion, preferably the visible region, this represents a simple geometry that can be manufactured without surface defects.

Furthermore, the carrier portion and in particular the core of the carrier portion can be made of a reinforced plastic, in particular a glass fiber-reinforced plastic. Particularly good carrier properties can be achieved as a result. In principle, a wide variety of combinations of materials are conceivable for the carrier portion and the decorative portion. Some possible combinations of materials are provided below strictly as examples:

- core and/or outer layer of carrier portion PA6 reinforced/decorative portion PA6 decorative
- outer layer of the carrier portion PA6 with cool touch effect/decorative portion PA6 decorative
- core/outer layer of carrier portion SAN reinforced/Decor portion PC ABS or ABS
- core/outer layer of the carrier portion POM reinforced/decorative portion POM decorative The decorative portion can have a different color than the outer layer of the carrier portion. This achieves a particularly high level of design freedom. However, the decorative portion and in particular the outer layer of the carrier portion can generally also have the same color.

The decorative portion, and preferably the visible region of the decorative portion, can according to a further embodiment be made of a plastic with a metallic visual appearance. Such plastics with a metallic visual appearance, which can be manufactured in particular by plastic injection molding processes (Mold In Metal Color—MIMC), are well known as such. They have a surface finish similar to chromium plating, but without the environmental and health issues of chrome plating. As explained, precisely such plastics with a metallic visual appearance often do not have the required durability. This problem is solved by the design of the actuating portion according to the invention, and in particular by the carrier portion formed by co-injection.

Preferably, according to a further embodiment, the outer layer of the actuating portion can at least regionally be made of a plastic with a cool-touch effect.

A mineral filler or metal particle, in particular ferromagnetic metal particles, can be embedded in the plastic of in particular the outer layer of the carrier portion. By embedding a mineral filler or metal particles in the plastic, the cooling typically associated with metal surfaces is achieved, although a plastic material is employed, which can also be processed accordingly in a plastic injection molding process and in particular in a co-injection process.

For example, the carrier portion and in particular the outer layer of the carrier portion can form the rear face of the actuating portion to be grasped by a vehicle occupant to actuate the vehicle door, and facing away from the vehicle inner. By being formed from a plastic with a cool touch effect, and in combination with a plastic with a metallic visual appearance forming the decorative portion that faces the front face of the actuating portion facing the vehicle inner, and preferably the visible region of the decorative portion, a vehicle occupant gains the impression of a metal handle, both visually and haptically.

To increase the cool-touch effect, the outer layer and/or the core of the carrier portion can be made of a plastic having good thermal conductivity. A plastic in the context of this invention preferably exhibits the cool-touch effect if the value measured with the "HapTemp" device developed for this purpose by "Ziegler-Instruments GmbH" is equal to or less than 19, preferably equal to or less than 15. This instrument is capable of measuring an equivalent of the perceived haptic temperature, wherein steel has a value of 0, glass has a value of 10, and Teflon has a value of 20. These values are based on a "HapTemp" device from 2012 (Serial No. 12.11.1), software version 16.2.8, most recently calibrated in January 2019.

According to a further embodiment, the core of the carrier portion can be configured at least regionally as a cavity. Plastics with a cool-touch effect or plastics with embedded mineral fillers or metal particles generally have a high density. In order to counteract this, a cavity can be formed in the core of the carrier portion. For example, in a plastic injection molding process, this can be achieved by injecting gas ($CO_2$ or nitrogen) into the still flowable plastic to displace corresponding material. The formation of such a cavity would for example also be possible in a plastic such as PA6-GF30.

According to a further embodiment, the decorative portion, and in particular the visible region of the decorative portion, can be bonded to the carrier portion with an in-mold painting method.

In this context, the in-mold painting process is treated as an injection molding method. The manufacturing method generally corresponds to the two-component injection molding method, wherein the cavity of the injection mold forming the decorative portion is of very low thickness. For example, the cavity can have a thickness of less than 1 mm, preferably less than 0.3 mm. The component (color) forming the decorative portion is pressed into the cavity for the decorative portion after co-injecting the carrier portion and forms a surface similar to a paint after curing. The design freedom with respect to the color of the decorative portion can thus be further increased with high surface quality.

The door handle assembly configured in particular as an inner door handle assembly serves in particular for opening and/or closing a vehicle door from the vehicle interior. To this end, the inner door handle assembly is mounted in the interior of a vehicle, such as a passenger vehicle or a commercial truck. The invention accordingly also relates to a vehicle having an inner door handle assembly mounted therein.

The inner door handle assembly comprises a housing, with which it is fastened to a vehicle door. An actuating portion that a vehicle occupant can manually actuate, for example grasp, is arranged on the housing. The actuating portion can be movably supported on the housing, for example in such a way that the actuating portion can pivot or is translationally movable. The actuating portion can for example be a handle element, in particular a handle lever, arranged to pivot on the housing. However, the actuating portion can for example also be a button or the like actuated by a vehicle occupant. The actuating portion can be formed to be actuated by a vehicle occupant to open or close a vehicle door from the interior.

The decorative portion and preferably the visible region of the decorative portion can be in particular formed by a portion (gate region) injection-molded onto the carrier portion of the actuating portion.

In this context, according to the invention, it can be provided in particular that the at least one gate region by which the material necessary for forming the decorative portion (plastic material) is injected into the corresponding mold cavity is formed by a region facing away from the visible region of the decorative portion, in particular in a gate lip or gate tab.

The region in which the gate lip or gate tab of the at least one gate region is formed for the material of the decorative portion is connected by a volumetric flow to the visible region of the decorative portion, wherein the region of the gate lip or gate tab is continuously enlarged as seen from the effective volumetric flow cross-portion and is redirected at the transition to the visible region of the decorative portion. Thus, homogenization and relaxation of the heated injection molding compound can be achieved in an effective manner when forming the decorative portion.

At the same time, by combining the construction of the carrier portion and the decorative portion according to the invention, and in particular by providing the gate region in a gate lip or gate tab in an region of the decorative portion that is continuously connected to the decorative portion's visible region by an edge region or arcuate region, surface defects can be particularly efficiently minimized when manufacturing with a multi-component injection molding method.

It has been shown that by providing the gate region for the decorative portion in a gate lip or gate tab that is continuously connected to the decorative portion's visible region via an edge region or arcuate region, in particular a shrinkage of the plastic material of the decorative portion can be reduced/minimized when curing the plastic material of the decorative portion, which would result in surface defects such as flow lines or voids.

By injection molding onto a carrier portion formed from a different material, as specified according to the above-mentioned embodiment of the decorative portion and preferably the visible region of the decorative portion, a shrinkage and the associated surface defects are minimized. The carrier portion and in particular the outer layer of the carrier portion then forms a stable basis for injection molding the decorative portion and preferably the visible region of the decorative portion, which can significantly reduce shrinkage. Flow lines and voids can be reliably avoided.

At the same time, using only one injection molding tool, the aforementioned embodiment allows the manufacturing of different decorative layers, preferably visible regions, e.g., made of plastics of different colors, depending on the respective application. This further increases flexibility.

According to embodiments, the plastic has an increased thickness in the region where the edge region or arcuate region is formed compared to a thickness of the plastic in a region further towards the gate region. Thus, it is possible to create an edge or arcuate region with the material of the decorative portion without creating an undercut. This is therefore easier to manufacture.

By providing a corresponding homogenization region for the melt of the second plastic, the quality of the surface appearance can be improved, in particular if a high-gloss and/or metallic surface appearance is desired, since the plastic of the decorative portion can flow over a wide surface region into the region that becomes a surface on the front face of the actuating portion.

According to embodiments, the at least one edge region or arcuate region of the plastic material of the decorative portion extending from a front face of the actuating portion to the rear face of the actuating portion extends over at least 25%, preferably at least 40%, preferably at least 70%, and most preferably 99% of the front face to rear face boundary of the actuating portion, preferably along at least an upper region of the actuating portion.

This can further enhance the appearance of the actuating portion as seen from the vehicle interior, because the decorative portion extends largely rearward. For example, the fact that the actuating portion is comprised of three materials cannot be noticeable to an occupant of the vehicle when the upper region of the actuating portion—provided it is conventionally installed in the vehicle door—is formed by the plastic material of the decorative portion extending rearward.

According to preferred embodiments, the decorative portion has a constant thickness over at least 70%, preferably at least 80% of its visible region, i.e., in case of doubt with a deviation of less than 30%, preferably less than 20% of the average thickness.

This further improves the visual appearance of the decorative portion, because the volumetric flow of the plastic material of the decorative portion is improved. Preferably, the carrier portion has a variable thickness, i.e., in case of doubt with a deviation of more than 30%, preferably more than 50% of the average thickness, in the regions in which the decorative portion has a constant thickness. The thickness is preferably measured from the front face to the rear face, along a surface datum line.

According to embodiments of the actuating portion according to the present invention, the decorative portion has a thickness of about 70%, preferably at least 80% of its visible region, in a range of 0.5 to 3.5 mm and preferably in a range of 0.7 mm to 1.7 mm.

This further improves the visual appearance of the decorative portion as the volumetric flow of the plastic material of the decorative portion is improved when the decorative portion is formed. Regarding the thickness, we have determined that it should neither be smaller to avoid obstacles nor larger to avoid zebra patterns than the indicated interval, preferably even the preferred interval, to minimize the risk of these undesirable effects.

According to embodiments of the actuating portion according to the invention, the decorative portion comprises a surface roughness RA of less than or equal to 2 µm, preferably less than or equal to 1.1 µm, or preferably a gloss of at least 60 gloss units measured at 60°, preferably 70 gloss units measured at 60° over 70%, preferably at least 90% of its visible region.

This further improves the visual appearance of the decorative portion. It has been found that the invention is particularly suited for high-gloss surfaces, which are very sensitive to volumetric flow turbulence and material shrinkage when forming the decorative portion.

According to a further embodiment, the decorative portion comprises at least 90%, and preferably at least 99% of the visible region of the actuating portion.

The invention also solves the aforementioned problem with a method of manufacturing an actuating portion for a vehicle door handle assembly, in particular inner door handle assembly, wherein the actuating portion comprises a carrier portion formed by co-injection with a core and an outer layer and a decorative portion integrally connected to the carrier portion, wherein the actuating portion is produced in a multi-component injection-molding method, in particular in a three-component injection-molding process. As already stated, particularly high-quality surfaces can thereby be produced with manufacturing engineering methods, while at the same time achieving high durability.

According to embodiments, the manufacturing method comprises at least the following steps:

the carrier portion is manufactured in a first co-injection step using a first mold half and a second mold half resulting in a first precast, and in a second injection molding shot, the decorative portion is produced on the first precast after a change of the first mold half and/or the second mold half, resulting in a second precast while the first precast remains in the first or second mold half until the second precast has been shot onto the first precast.

Alternatively, the manufacturing method comprises at least the following steps:

the decorative portion is produced from a first plastic in a first injection molding shot using a first mold half and a second mold half, resulting in a first precast; and the carrier portion is produced in a second co-injection step fired at the first precast after a change of the first mold half and/or the second mold half, resulting in a second precast, while the first precast remains in the first or second mold half until the second precast is fired at it.

In the method according to the invention, it is provided in particular that, in the co-injection step, first the plastic component of the outer layer and then the plastic component of the core are injected into the mold sequentially from the same injection point, wherein, during or after the injection of the plastic component of the core, a gaseous injection medium is preferably also injected.

Preferably, the outer layer of the carrier portion formed by co-injection consists, at least regionally, of a plastic having a cool-touch effect. Alternatively or additionally, the core of the carrier portion formed by co-injection is formed in particular by gas injection and is foamed at least regionally.

The core of the carrier portion formed by co-injection consists in particular of a first plastic component, in particular a glass fiber-reinforced plastic component, and wherein the outer layer of the carrier portion formed by co-injection consists of a second plastic component different from the first plastic component.

BRIEF DESCRIPTION OF THE DRAWINGS

Exemplary embodiments of the invention are described in further detail below with reference to the accompanying drawings.

DETAILED DESCRIPTION

Figures 1, 2:
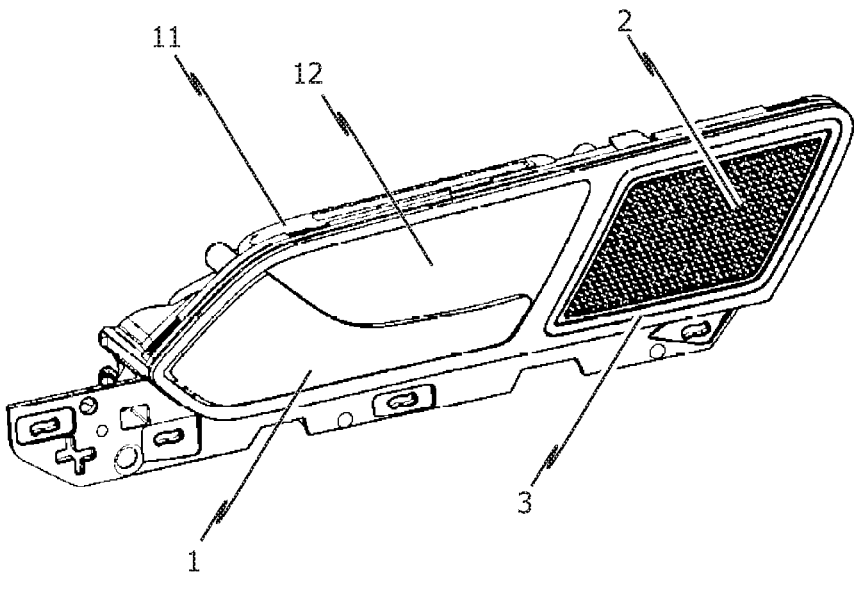
FIG. 1 shows schematically, and in an isometric view, an exemplary embodiment of an inner door handle assembly with an actuating portion embodied as a handle element according to an exemplary embodiment of the invention.
FIG. 2 shows schematically, and in an isometric view, the actuating portion or handle element of the inner door handle assembly according to FIG. 1, in an enlarged view.

Unless otherwise indicated, the same reference numerals in the figures refer to the same objects.

The inner door handle assembly shown in FIG. 1 comprises a housing 11 that allows it to be mounted to a door of a vehicle, such as a passenger car or commercial truck.

The housing 11 comprises a handle recess 12 in which an actuating portion 1 configured as an actuating element, in the present example a handle element, is received in the resting position shown in FIG. 1.

From this resting position, the handle element 1 can be pivoted with its right free end in FIG. 1 out of the handle recess 12 about a pivot axis, for example a vertical pivot axis. By means of a corresponding connection, the vehicle door is unlocked by pivoting out the handle element 1 so that the vehicle door can subsequently be opened by a vehicle occupant. As the handle element 1 is pivoted out, the vehicle occupant reaches into the handle recess 12 and grasps behind the handle element 1. In the example shown, the handle element 1 forms a handle lever. A loudspeaker 2 that is surrounded by a bezel 3 is also integrated in the housing 11.

In the enlarged illustration of FIG. 2, it can be seen that the handle element 1 comprises a carrier portion 4 facing away from the vehicle interior in the resting position and a decorative portion 5, preferably a visible region 6, facing the vehicle interior.

The carrier portion 4 forms the rear face of the handle element 1 to be grasped from behind by a vehicle occupant, and the visible region 6 of the decorative portion 5 forms the front face of the handle element 1 that is directly visible from the vehicle inner. At its left end in FIG. 2, the carrier comprises bearing means 7, with which the handle element 1 can be pivoted on the housing 11.

The visible portion 6 of the decorative portion 5 is connected to the carrier portion 4 in a substance-to-substance bond. In the example shown, the visible region 6 of the decorative portion 5 has been injected onto the carrier portion 4 with a multi-component injection molding method.

The carrier portion 4 is overall made of a plastic and is divided into a core 9 and an outer layer 10, for example a reinforced plastic, which surrounds the core 9 at least regionally, such as a glass fiber-reinforced plastic. It can comprise an embedded mineral filler or embedded metal particles, for example ferromagnetic metal particles, in such a way that a vehicle occupant perceives a cool surface upon grasping behind the carrier portion 4 in order to pivot the handle element 1 out of the handle recess 12 of the housing 10 and thus has the impression of a metal.

Accordingly, the visible region 6 of the decorative portion 5 can consist of a plastic (mold-in-metal color—MIMC) with a metallic visual appearance.

However, the visible region 6 of the decorative portion 5 could also consist of other plastics, for example, differently colored plastics or the like. The visible portion 6 of the decorative portion 5 could also be connected to the carrier portion 4 in a substance-to-substance bond in an in-mold painting method, and in particular to the outer layer 10 of the carrier portion 4.

In the example shown, the bezel 3 of the loudspeaker 2 has also been injected into the housing 11 with a multi-component injection molding method. For example, the bezel 3 can be comprised of the material used for the visible region 6 of the decorative portion 5.

The decorative portion 5, and in particular the visible region 6 of the decorative portion 5, is intended to be visible at least partially directly from the vehicle inner and faces the vehicle inner, wherein the handle element 1 has a front face facing the vehicle inner and a rear face facing away from the vehicle inner.

Figure 3:
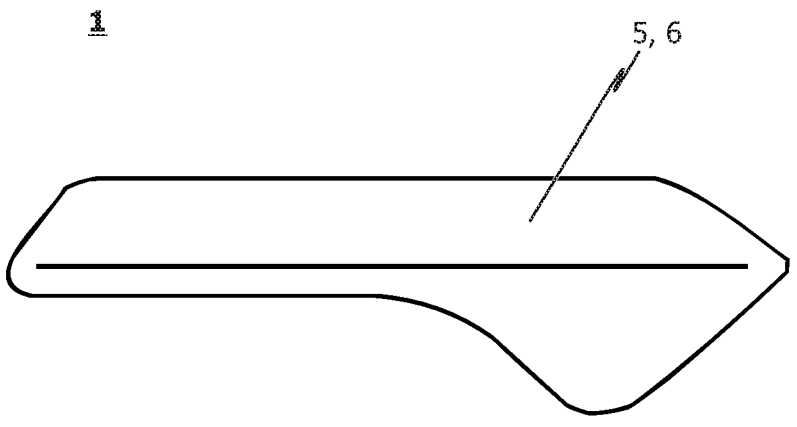
FIG. 3 shows schematically, and in an aerial view, the A-side of an exemplary embodiment of the actuating portion according to the invention.

A first exemplary embodiment of the actuating and handle element 1 according to the invention is described in greater detail in the following with reference to the drawings in FIG. 3 to FIG. 4.

As shown, the actuation element or handle element 14 according to the invention comprises a carrier portion 20 and a decorative portion 21 covering the surface of the carrier portion 20 at least regionally. In this case, it is provided in particular that the decorative portion 21 not only comprises the visible region 22 (seen in FIG. 3), but also an edge region 23 of the actuating portion or handle element 14.

Figure 4:
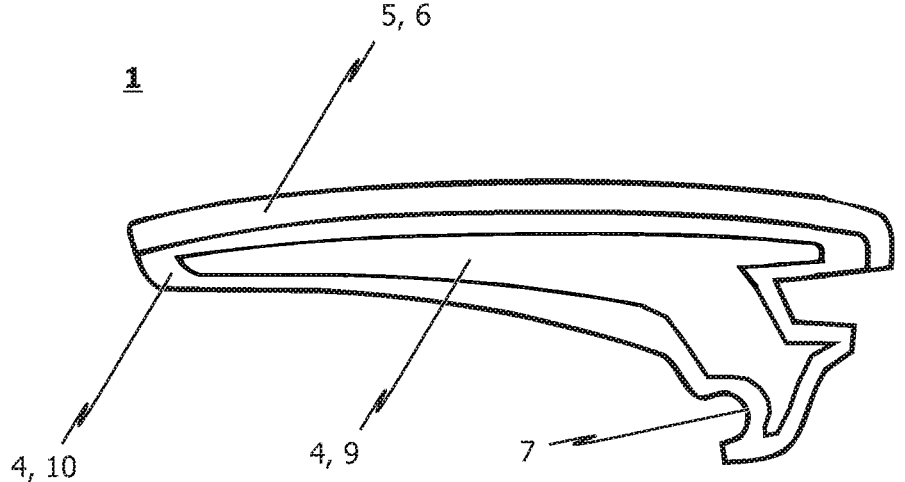
FIG. 4 shows schematically, and in a cross-sectional view, the exemplary embodiment of the actuating portion according to the invention according to FIG. 3.

Specifically, the edge region 23 is connected by an edge region or arcuate region 25 to the visible region 22 of the decorative portion 21, as can be seen from the cross-sectional view in FIG. 4.

The cross-sectional view in FIG. 4 further shows that the carrier portion 20 comprises a core or core region and an outer layer, wherein the carrier portion 20 has been formed by co-injection.

The actuating portion or handle element 14 according to the exemplary embodiment shown in the drawings is preferably manufactured with a three-component injection molding method. In this case, it is provided in particular that the plastic material of the decorative portion 21 is at least partially applied to the surface of the outer layer of the carrier portion 20 and is bonded to the outer layer in a substance-to-substance bond.

For manufacturing the carrier portion of the actuating or handle element 14, it is provided that the carrier portion is formed by co-injection. Preferably, the outer layer of the carrier portion is at least regionally formed from a plastic with a cool-touch effect. The core of the carrier portion can be formed by gas injection and foamed at least regionally.

In order to form the decorative portion 21 on the regions of the surface of the outer layer of the carrier portion 20, it is in particular provided that the plastic material of the decorative portion 21 is injected through gate channels as a heated injection molding compound into a corresponding mold cavity, wherein this mold cavity is for example constrained by the carrier portion 20 and at least one tool plate (not shown in the drawings).

To this end, an injection molding tool is preferably used, which comprises at least one distributor channel, which leads to a gate region. In particular, in the exemplary embodiment of the actuating or handle element 14, a point gate is provided in order to at least partially form the decorative portion 21 on the outer layer of the carrier portion 20.

This makes it possible to design surfaces and parting lines between the plastics in such a way that the visual quality of the decorative portion is improved.

In particular, an underfloor gate system, such as the so-called banana gate, can be provided in order to form the decorative portion 21 on the outer layer of the carrier portion 20, wherein the decorative portion 21 is injected such that the heated injection molding compound of the plastic material of the decorative portion 21 is homogenized and smoothed as a volumetric flow in the mold cavity corresponding to the decorative portion 21 before the heated injection molding compound reaches the region of the mold cavity that corresponds to the visible region 22 of the completed actuating portion or handle element 14.

This improves the surface quality, because the flow of the plastic is better balanced.

The invention in particular introduces an inner door handle/method for manufacturing such a door handle (actuating portion). It comprises at least three plastic layers or regions, namely a first plastic layer formed by the outer layer 10 of the carrier portion 4, a second plastic region formed by the core 9 of the carrier portion 4, and a third plastic layer formed by the decorative portion 5, wherein the plastic layers/regions are joined by injection molding. The first layer forms a rear face and the third layer forms a visible front face of the actuating or handle element 1.

The invention is not limited to the embodiments shown in the drawings, but results when all of the features disclosed herein are considered together.

LIST OF REFERENCE NUMERALS

1 Actuating portion/actuating portion/handle element
2 Loudspeaker

3 Bezel
4 Carrier portion
5 Decorative portion
6 Visible region of the decorative portion
7 Bearing means
8 Edge region/arcuate region
9 Core/core region of the carrier portion
10 Outer layer of the carrier portion
11 Housing
12 Handle recess

The invention claimed is:

1. An actuating portion for a vehicle door handle assembly, wherein the actuating portion has been produced in a multi-component injection-molding method, and wherein the actuating portion comprises a carrier portion formed by co-injection-molding, having a core and an outer layer, and a decorative portion integrally connected to the carrier portion;
  wherein the outer layer of the carrier portion formed by co-injection comprises, at least regionally, a plastic having a cool-touch effect;
  wherein one of the carrier portion or the decorative portion has been produced in a first co-injection step using a first mold half and a second mold half, resulting in a first precast, and wherein the other of the carrier portion or the decorative portion has been produced in a second injection-molding step fired at the first precast after a change of the first mold half or the second mold half, resulting in a second precast, while the first precast remains in the first mold half or second mold half until the second precast is fired at the first precast.

2. The actuating portion according to claim 1,
  wherein, in the co-injection step, first a plastic component of the outer layer and then a plastic component of the core are injected into the mold sequentially from the same injection point, wherein, during or after the injection of the plastic component of the core, a gaseous injection medium is also injected.

3. The actuating portion according to claim 1,
  wherein the core of the carrier portion formed by co-injection is formed by gas injection and is foamed at least regionally.

4. The actuating portion according to claim 1,
  wherein the decorative portion is connected to the carrier portion at least in parts or regionally by means of a positive-lock connection, by an engagement of at least one first connecting partner provided on the decorative portion and at least one second connecting partner provided on the carrier portion.

5. The actuating portion according to claim 1
  wherein the core of the carrier portion formed by co-injection consists of a first plastic component, which is a glass fiber-reinforced plastic component, and wherein the outer layer of the carrier portion formed by co-injection consists of a second plastic component different from the first plastic component.

6. The actuating portion according to claim 5,
  wherein the decorative portion consists of a third plastic component different from the first and second plastic components.

7. The actuating portion according to claim 6,
  wherein the third plastic component forms at least one convex edge or at least one convex arcuate region on a surface of the actuating portion, such that the third plastic component extends in the direction of a rear face of the actuating portion.

8. The actuating portion according to claim 7,
  wherein a region of the surface of the rear face of the actuating portion is formed by the third plastic component, which extends from a front face of the actuating portion to the rear face of the actuating portion and forms the at least one edge or the arcuate region.

9. A method of manufacturing an actuating portion for a vehicle door handle assembly, wherein the actuating portion comprises a carrier portion formed by co-injection with a core and an outer layer and a decorative portion integrally connected to the carrier portion, wherein the actuating portion is produced in a multi-component injection-molding method;
  wherein the outer layer of the carrier portion formed by co-injection comprises, at least regionally, a plastic having a cool-touch effect;
  wherein one of the carrier portion or the decorative portion is produced in a first co-injection step using a first mold half and a second mold half, resulting in a first precast, and wherein the other of the carrier portion or the decorative portion is produced in a second injection-molding step fired at the first precast after a change of the first mold half and/or the second mold half, resulting in a second precast, while the first precast remains in the first or second mold half until the second precast is fired at the first precast.

10. The method according to claim 9,
  wherein, in the co-injection step, first a plastic component of the outer layer and then a plastic component of the core are injected into the mold sequentially from the same injection point, wherein, during or after the injection of the plastic component of the core, a gaseous injection medium is also injected.

11. The method according to claim 9,
  wherein the core of the carrier portion formed by co-injection is formed by gas injection and is foamed at least regionally.

12. The method according to claim 9,
  wherein the core of the carrier portion formed by co-injection consists of a first plastic component, which is a glass fiber-reinforced plastic component, and wherein the outer layer of the carrier portion formed by co-injection consists of a second plastic component different from the first plastic component.

13. A door handle assembly of a vehicle, in particular an inner door handle assembly, comprising a housing and an actuating portion according to claim 1 movably arranged on the housing.

* * * * *